Figure 9:
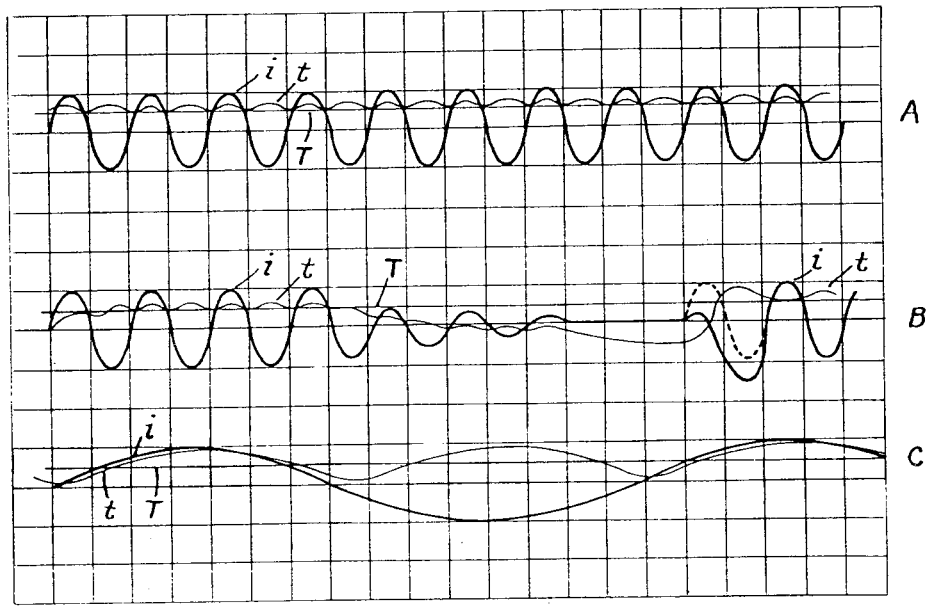

Jan. 13, 1925. 1,522,993
P. P. ALEXANDER
RESISTANCE LINE WELDING
Filed Dec. 20, 1922  2 Sheets-Sheet 1
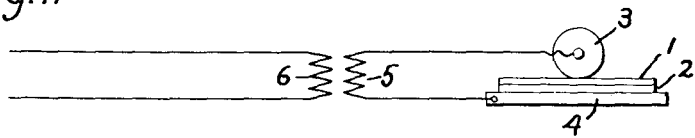
Fig. 1.
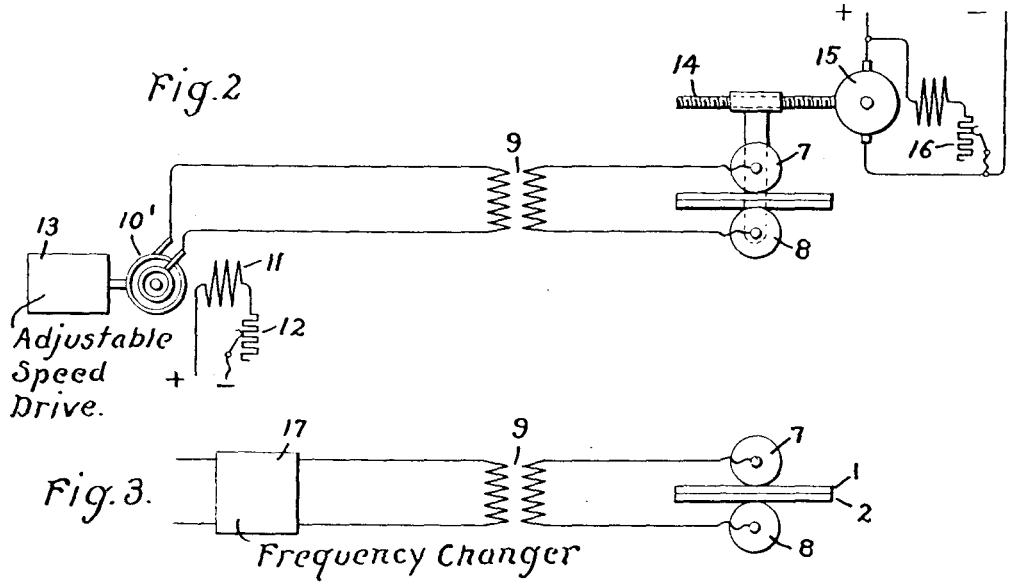
Fig. 2.
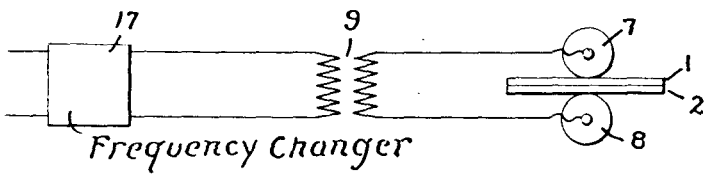
Fig. 3.
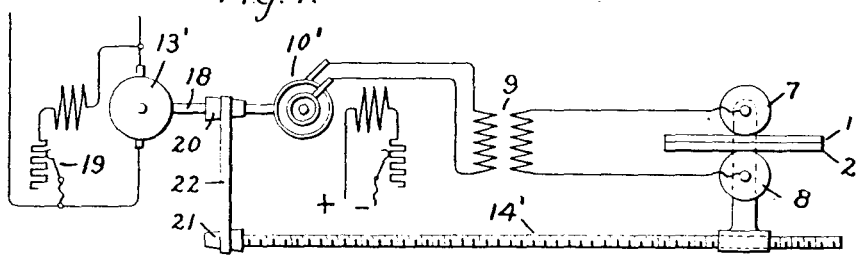
Fig. 4.
 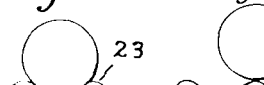 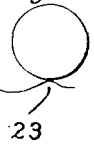 
Fig. 5.  Fig. 6.  Fig. 7.  Fig. 8.
Inventor:
Peter P. Alexander,
by Alexander D. Lunt
His Attorney.

Patented Jan. 13, 1925.

1,522,993

UNITED STATES PATENT OFFICE.

PETER P. ALEXANDER, OF LYNN, MASSACHUSETTS, ASSIGNOR TO GENERAL ELECTRIC COMPANY, A CORPORATION OF NEW YORK.

RESISTANCE LINE WELDING.

Application filed December 20, 1922. Serial No. 607,949.

*To all whom it may concern:*

Be it known that I, PETER P. ALEXANDER, a citizen of Russia, residing at Lynn, in the county of Essex, State of Massachusetts, have invented certain new and useful Improvements in Resistance Line Welding, of which the following is a specification.

My invention relates to resistance line welding and more particularly to a system and method of operation involving the application of low frequency currents to produce the weld.

Resistance line welding is customarily practiced by passing the welding current through a pair of overlapped sheets to be welded and producing the line weld by a relative motion of traverse between the work and the welding electrodes in the line of the desired weld. It is common to use either a pair of rotatable electrodes between which the work is passed or one rotatable electrode and a cooperating mandrel on which one of the sheets to be welded lies. Difficulties have been experienced in the use of such machines when welding thin sheets owing to buckling and burning of the work and even greater difficulties are encountered when the sheets to be welded become of substantial thickness so that hitherto it has been very difficult to weld together sheets having a thickness materially exceeding from $\frac{1}{16}$ inch to $\frac{3}{32}$ inch. The large currents necessary for welding sheets of greater thickness not only cause buckling and burning of the work, due to the great heat developed, but also result in the rapid deterioration of the welding electrodes.

Alternating current is customarily used for supplying the welding electrodes which are connected in any suitable way to the secondary of the transformer whose primary is supplied from any suitable source of constant frequency. In order to lessen the difficulties due to buckling and burning of the work, it has been proposed to interrupt the welding circuit rapidly and inasmuch as it is impossible to build an interrupter to interrupt successfully the large welding currents necessary, the circuit interrupting device has been applied to the primary circuit of the transformer. Such an arrangement may be used with a fair degree of success where the sheets to be welded are relatively thin but even with such sheets, difficulties are encountered due to the fact that the interruptions of the current are so irregular as to result in burning of the work in spots for reasons which will be hereinafter pointed out more in detail. The capacity of such an arrangement moreover is limited since an interrupter cannot be made to interrupt successfully a current much in excess of two or three hundred amperes. Where relatively thick sheets are to be welded, the primary current may greatly exceed this value, and the capacity of the system cannot be increased simply by using a higher voltage on the primary of the transformer for the reason that the use of higher voltages results in increased difficulties with the circuit interrupting apparatus.

An object of my invention is to provide a system and method of operation which does not involve the use of devices requiring skilled attention and by which strong and reliable welds may be secured, and such welds made in sheets ranging from very thin sheets to sheets of a thickness greatly in excess of anything which has heretofore been thought possible to weld by the resistance line welding method.

A further object of my invention is to provide means whereby the welding action is produced with a high degree of efficiency and a high power factor in the welding circuit and whereby a weld is produced which has the characteristics of a hammered or forged weld whereby irregularities in the stock effect the weld to but a negligible extent.

According to my invention I supply the welding electrodes with a low frequency current. The frequencies which I use are substantially lower than ordinary commercial frequencies for power or lighting circuits, which range from 25 cycles up, the most common frequency being in the neighborhood of 60 cycles per second. I use a frequency of from about 5 to about 15 cycles per second, 8 to 10 cycles being a good average. As will be pointed out hereinafter the frequency preferably is varied slightly according to the results desired and the thickness of the work.

My invention will be better understood from the following description taken in connection with the accompanying drawing, and its scope will be pointed out in the appended claims.

In the accompanying drawing, Fig. 1 diagrammatically indicates a line welding system which may be used to carry out my invention and in which the sheets to be welded lie between a rotatable welding electrode and a cooperating mandrel; Fig. 2 diagrammatically indicates an embodiment of my invention wherein the welding current is supplied from an alternating current generator driven by an adjustable speed prime mover or other motor; Fig. 3 indicates an embodiment of my invention in which the welding electrodes are supplied from a frequency changer of any suitable character; Fig. 4 diagrammatically shows an embodiment of my invention wherein means are provided whereby a variation in the speed of traverse of the welding electrodes along the line of the weld may be secured automatically and simultaneously with a change in the frequency of the source of welding current; Figs. 5, 6, 7 and 8 are diagrammatic illustrations showing how the welding electrode acts upon the work during different phases of operation; Fig. 9 is a curve sheet which facilitates the description and understanding of my invention and the differences between my invention and devices of the prior art.

Referring to Fig. 1, the sheets 1 and 2 to be welded lie between welding electrodes comprising a rotatable electrode 3 and a cooperating mandrel 4. The electrodes 3 and 4 are connected to the secondary 5 of a transformer whose primary 6 is supplied with low frequency current. Relative motion between the electrodes and the work may be produced either by moving the work or moving the electrodes, as is well known in the art.

Referring to Fig. 2 the welding electrodes 7 and 8 are supplied from a transformer 9 which is in turn supplied from a low frequency alternating current generator 10, represented as a synchronous generator whose field winding 11 is supplied from any suitable source of direct current through an adjustable rheostat 12 which can be varied to vary the voltage of the generator to vary the welding current. The generator is represented as driven from an adjustable speed driving means 13 which may be either an adjustable speed prime mover of any desired type or an adjustable speed electric motor of any desired type. In Fig. 2 the motion of traverse between the work and the welding electrodes is represented as produced by means of a lead screw 14 driven by an electric motor 15 indicated as a direct current motor whose speed may be adjusted by means of the field rheostat 16. As heretofore indicated it is immaterial whether the electrodes are moved and the work stationary or the work moved and the electrodes stationary. Where circular welds are to be produced, as for example, in barrels or drums, the electrodes are customarily stationary and the work rotated so as to move between the welding electrodes.

In Fig. 3, the welding transformer 9 is diagrammatically represented as supplied from a frequency changer 17. As is obvious to those skilled in the art, the frequency changer may be of any desired type which will change the frequency of any particular installation to the low frequency necessary for welding according to my invention.

While I have indicated in Figs. 2 and 3 but one welding circuit supplied from the generator 10 and frequency changer 17, respectively, it will be obvious to those skilled in the art that any desired number of welding circuits may be supplied in parallel from either source of current.

The arrangement of Fig. 4 corresponds generally to the system shown in Fig. 2, but the lead screw 14' which moves the welding electrodes, is here shown as driven from the shaft 18 connecting the generator 10' to the motor 13' whose speed may be adjusted by the field rheostat 19. With this arrangement any adjustment of the speed and frequency of the generator 10' produces a proportional variation in the speed of motion of the welding electrodes along the line of the weld. In order to adjust the speed of the welding electrodes independently of the speed of the generator, I provide variable speed gearing between the shaft 18 and the lead screw 14' and this adjustable speed gearing is diagrammatically represented as comprising cone pulleys 20 and 21 and a driving belt 22 which may be adjusted longitudinally of the cone pulleys in a manner well known in the art.

From the preceding description it will be apparent that my invention may be applied to any ordinary line welding machine. Having now briefly indicated several embodiments of my invention, I will explain what I conceive to be the reason why the use of low frequency produces an improved weld and why it is that large stock may be successfully handled. This will be explained in connection with Figs. 5 to 9, inclusive.

With the welding circuit open the welding electrode will rest upon the surface of the work, as indicated in Fig. 5. Line welding machines are customarily provided with a weight or spring, or both, to press the electrodes against the work with a predetermined pressure. The frequency of the current, which I use, is so low that for a considerable interval near the zero point of each alternating current wave the temperature of the work is below a welding value. As the current rises toward its maximum value, the heating effect increases and the welding electrode begins to sink into the work forming a cavity therein as indicated in Fig. 6. Simultaneously with the sinking of the electrode into the work, hot metal is pressed out to form ridges 23 each side of the welding electrode. As the current decreases from its maximum value the heating effect decreases and before the zero point of the alternating current wave is reached, the temperature falls below a welding value and the ridges 23 solidify. During the period over which the instantaneous values of the current are below the welding value, the electrode climbs out of the cavity onto the ridge 23, as indicated in Fig. 7. When the instantaneous value of the welding current is again sufficient to produce a welding temperature in the work, the electrode again sinks into the work and forms a cavity therein as shown in Fig. 8. This action is successively produced, a ridge being formed each time the current falls below the welding value and a cavity being formed each time the wave of current passes through a maximum value in either direction. The efficiency of the welding action is increased by reason of the formation of the ridge since there is thus automatically and artificially produced an increased resistance at the time the welding current approaches the welding value, the current thus being better concentrated to produce an effect analogous to what is known in the spot welding art as button or projection welding, wherein the plates to be spot welded together are separated by buttons or projections which concentrate the welding current to the spot in which the weld is to be made. Since the zero values of the current wave occur at absolutely definite intervals, to secure the maximum benefit from the ridge effect, it is merely necessary to adjust the speed of the welding electrode along the work to the proper value. I preferably adjust the speed so that the electrode is moved during the cooling period a distance of from one-third to two-thirds of the size of the spot, a series of overlapping spot welds being thus produced. The action described produces an effect similar to that produced by hammering or forging the weld. Irregularities in stock thus affect the weld to a much less extent than in ordinary line welding. Since a perfectly definite and predetermined cooling interval is provided and a perfectly definite and predetermined heating interval also, the temperature of the metal is under perfect control and there is no difficulty from overheating or burning of the work. A longer life of the welding wheel also results since current of a welding value is applied only during the moment when it is necessary. Water cooling of the electrode and the work in any desired manner, as, for example by streams of water sprayed thereon, is desirable but not essential to successful welding.

It is particularly important properly to coordinate the diameter of the welding wheel, the speed of traverse of the work and the frequency of the current employed. If a very large diameter of welding wheel is used, it is evident that the contact area will be elongated and that it will require a very low frequency indeed to allow, at any given speed, separate or renewed welding to take place in the manner heretofore indicated. However, by speeding up, even with a very large roll, it is possible to secure the desired action. Looked at in another way, if the welding roll is small so that the contact area is very restricted, a condition which is suitable for very thin stock only, then a higher frequency may be employed in making the weld for the reason that the metal which forms the ridges can escape from under a roll with a small diameter, traversed at any given speed, much more readily than it can escape from under a roll of larger diameter. Welds can, however, be made with considerable variation in the speed of travel or in the number of interruptions per inch of travel. On light gauge metal from .010 to .015 I have secured very successful results with a speed of traverse of about 60 inches per minute, using a frequency of 10 cycles per second. This frequency and speed of travel produces 20 spots per inch. I prefer to produce from 10 to 30 overlapping spots per inch, 20 spots being a good average. With stock having a thickness of $\frac{3}{32}$ inch, it will be much better to reduce the speed of travel to about 30 inches per minute. The optimum conditions may be very easily determined by experiment and roughly the speed of travel will be reduced with increases in thickness of the stock in the ratio of approximately 1:3. With increased thickness of stock it is desirable to reduce the frequency somewhat. It will be apparent that with a fixed frequency the speed of travel for any given number of spots per inch should, of course, vary directly with the frequency. If, however, the frequency is very high so that the welding current falls below the welding value a great number of times per second and the travel is slow, the advantage of my method is lost entirely since there is no effective cooling action between spots and the work maintains a practically uniform temperature which is above the welding value. In such case there will be produced a continuous wave of molten metal in front of the welding roll, which wave is not produced with my method of operation. Moreover, if the speed of the work is made extremely high, for example, several hundred inches per minute, and a frequency in the neighborhood of 60 cycles per second used, the advantage of my method will be again entirely lost since no effective ridge effect will be secured. Very high speeds of travel are therefore undesirable and reduce the reliability of the weld and as heretofore stated I prefer to use not over about 60 inches per minute on lighter work and not over 30 inches per minute on $\frac{3}{32}$ inch stock. For heavier stock I increase the current to a point where a suitable weld can be made and reduce the speed of travel and also reduce the frequency somewhat where the apparatus used makes an adjustment of the frequency practicable.

The advantages of my invention may be more clearly apprehended from a consideration of the curves shown in Fig. 9. In each of the curves A, B and C, $i$ represents the welding current, $t$ represents the temperature of the weld produced by this current and T represents the welding temperature needed for any given stock.

Curve A represents the conditions obtaining in ordinary resistance line welding using a welding current having a frequency of 60 cycles per second without any circuit interrupter in the primary circuit of the transformer. It will be observed that the temperature $t$ of the weld is practically constant and is continuously above the welding temperature T of the stock which may be, for example 1200 degrees C. With this kind of welding as heretofore indicated special precautions must be taken to prevent overheating of the welding wheel and damage to both the weld and the wheel, and the size of stock that may be welded under the optimum conditions is not much in excess of $\frac{1}{16}$ inch thick, $\frac{3}{32}$ inch being practically the maximum.

Curve B represents the conditions obtained in resistance line welding using a frequency of 60 cycles per second and a mechanical circuit interrupter to interrupt the primary current so as to produce alternate periods of welding and cooling, each welding period comprising a small group of cycles of welding current. As heretofore indicated, the heating during each period of welding with such arrangement is irregular and not subject to definite predetermination. This irregularity is due to the fact that the circuit interrupter does not close or open the circuit at a definite point in the wave. If the interrupter happens to open at a certain point in the wave the current may be definitely cut off instantaneously. If the interrupter happens to open at a different point in the wave, there may be sparking at the contacts and the reactance of the circuit may maintain the arc for an interval which in duration is comparable to the interval during which the welding circuit is closed and the work will be heated during this interval to an extent depending on how rapidly the current falls off. This is indicated by the middle portion of curve B which shows that the temperature $t$ of the stock falls off but gradually during this interval. The stock is therefore not cooled during this cooling interval to the same extent that it would have been cooled if the interrupter had cut off the current instantaneously. Not only is a variable heating effect produced upon the opening of the interrupter but the heating effect is also variable by reason of the fact that the circuit interrupter may close the circuit at different points in the wave. At the left-hand end of the curve B a condition is represented where the circuit interrupter closes at the time the current wave $i$ would be passing through zero. In this case, the wave of current $i$ starts off with its true and permanent wave form. If, however, the circuit interrupter closes at a different point in the current wave, a transient effect is produced which may for a cycle or two produce a heating current very considerably in excess of that produced under the condition represented at the left hand end of the curve B. This transient effect is indicated at the right-hand end of the curve B where the dotted portion of the curve $i$ indicates the true wave form of current and the condition represented is that which will occur where the circuit interrupter is closed at the instant when the current, as shown by the dotted line, would be at its maximum value if it were not for the transient effect. It will be observed that the actual current $i$ reaches a value far in excess of the maximum value of the normal current wave, thus causing the temperature of the stock $t$ to increase suddenly considerably above its normal maximum temperature. With such a system, it is apparent that there may be some heating during intervals where cooling is supposed to take place and that the heating which occurs during the interval when the circuit is supposed to be closed is also variable. In other words, where an interrupter is used, the closing and breaking of the circuit can never produce exactly predeterminable results. The closing may take place at one part of the wave at one moment and at another part of the wave at another moment and the opening of the circuit is likewise variable. The making and breaking of the current may take place with respect to the wave in all kinds of irregular relations. The work may, therefore, be burned at points and the weld may be insufficient at other points. This irregular action thus makes the welding uncertain and these difficulties are entirely independent of the fact that the circuit interrupter system cannot be designed to interrupt the currents required for stock of any considerable thickness.

Curve C represents the conditions obtained with low frequency welding according to my invention. It will be observed that the temperature $t$ of the stock falls below and rises above the welding temperature T at perfectly definite and predetermined times so that the duration of the heating and cooling intervals is regular and predeterminable. It will also be observed that for the same maximum value of welding current that is used in curves A and B the temperature of the weld rises well above the maximum temperature to which it rises in curves A and B, and since the welding temperature is under full control the weld may be produced more quickly and with better results. To a certain extent the conditions secured by so-called flash or snap welding are secured, a high predetermined current being applied to the stock for a definite predeterminable interval. The stock and the welding wheel are then allowed a definite predeterminable cooling interval and so on. Since no circuit breaker of any kind is required, the process may be applied to seam welding of sheets of any desired thickness, limited only by the capacity of the machine.

Since cooling intervals of appreciable duration are desired, a sinusoidal form of wave current is preferred to a flat-topped wave form. Since, owing to the low frequency used, the reactance of the circuit is of small effect, a peaked form of current wave may be used where it is desired to produce an exceptionally high heating effect during the maximum interval of the wave, but I prefer to use an ordinary sinusoidal wave form.

The extent to which the stock is cooled during the interval when the current is below a welding value is of course affected by the rate at which the stock is moved and the size and character of the welding wheel, and by the system of cooling used, if any. But these effects are so uncertain that they cannot be predetermined exactly and are moreover of negligible importance according to my invention, since the heating effect is dependent principally upon the value of the current and during the cooling intervals the temperature of the stock will be reduced below a welding temperature even though the speed of traverse be so low as to leave the electrode substantially stationary on the work during the welding intervals of the current wave.

According to my invention, it is not only possible to weld any thickness of stock with greater precision and certainty than with any system of the prior art with which I am familiar, but it is also possible to weld together metals which are ordinarily difficult to weld satisfactorily, such, for example, as nickel, tungsten, molybdenum and alloys.

One of the great advantages of low frequency as applied to welding generally, and especially to seam welding, according to my invention, is that the induction effects which are very great in the case of such large currents as are necessary for welding are correspondingly reduced as the frequency is reduced. The drop in voltage due to the reactance of a welding circuit becomes a very formidable obstacle where large currents of relatively high frequency are used and when the work is of magnetic material, this voltage drop varies with the position of the work in the welding machine. The drop in voltage in the leads from the welding transformer to the work, and in the work itself, becomes very much less with the low frequency; and to such an extent that there is a very excellent improvement in the power factor of the apparatus.

The exact control of the temperature of the work provided by my invention is of special advantage for welding any stock since it allows lower speeds of traverse and sufficient heating of the work without danger of burning the metal and destroying the reliability of the weld. The fact that the welding effect is more nearly proportional to the maximum value of the welding current, rather than its mean effective value, is also an important factor which makes it possible to increase the thickness of the stock to be welded. While it is true that the heating effect throughout the whole cycle with low frequency current is proportional to the effective value of the alternating current, as distinguished from the maximum value, the whole period or cycle covers the time of cooling between welds as well as the time of welding, whereas with high frequency current the heating effect is proportional to the effective value of the current as distinguished from the maximum value throughout the welding operation.

While my invention is of principal importance where the weld is to be made with a series of overlapping spots, it will be obvious to those skilled in the art that some advantages of my invention may be obtained even where a series of separated spots are produced; for example, if a tight weld is not desired the speed of the work and size of the welding wheel may be so proportioned that a series of separated spots are produced. During each welding period, the heating effect is predeterminable and extremely high so that the work may be moved very rapidly and a better weld secured at each spot than could be secured by a high frequency interrupted alternating current, although the ridge effect disappears with such speeds of traverse.

What I claim as new and desire to secure by Letters Patent of the United States, is:

1. The method of resistance welding wherein a rotatable electrode is arranged to bear against and conduct alternating current into the work and wherein the electrode and work are moved relatively to produce a line of spot welds, characterized by the continuous application of welding current of such low frequency that the temperature of the weld falls to a non-welding value during an interval at each zero point of the alternating current wave independently of whether such relative movement is rapid or so slow as to leave the electrodes substantially stationary on the work during the welding intervals of the current wave.

2. The method of resistance line welding which comprises continuously applying to the welding electrodes an alternating current of such low frequency that the temperature of the weld falls to a non-welding value during an interval at each zero point of the alternating current wave whereby the work is alternately heated and permitted to cool to produce a succession of spot welds and which further comprises moving the electrodes and work relatively and uniformly at such speed that the center of the electrode during a welding interval is over the solidified edge of the preceding spot.

3. The method of resistance line welding which comprises continuously applying to the welding electrodes an alternating current of such low frequency that the temperature of the weld falls to a non-welding value during an interval at each zero point of the alternating current wave, whereby the work is alternately heated and permitted to cool to produce a succession of spot welds, and which further comprises moving the electrodes and work relatively and uniformly at such speed that the movement during the cooling interval is of the order of one-third to two-thirds of the length of each spot.

4. The method of operating a resistance line welding machine of the type wherein a rotatable electrode is arranged to press upon and conduct current into the work, and wherein means are provided for producing relative motion between the electrode and work at a uniform rate, which comprises continuously applying an alternating current of such amplitude and frequency that the metal of the weld is brought to a welding temperature during each half cycle of the welding current and permitted to cool and solidify during an interval at each zero point of the current wave, and maintaining such rate of motion that a series of overlapping spot welds are produced, the electrode producing a cavity in the work during each half wave and expelling metal to produce a ridge which ridge cools and hardens during each such cooling interval and lies under the electrode during the next welding interval whereby the current is concentrated and the resistance increased during each welding interval.

5. The method of resistance line welding which comprises continuously applying to the welding electrodes an alternating current of a frequency below 25 cycles per second and sufficiently low to produce material cooling and hardening of the weld during an interval at each zero point of the wave and moving the electrodes and work relatively at such a speed as to produce a series of overlapping spot welds.

6. The method of resistance line welding which comprises continuously applying to the welding electrodes an alternating current of a frequency not substantially less than five cycles per second nor substantially greater than fifteen cycles per second, and moving the electrodes and work relatively so as to produce a series of spot welds.

7. A system for resistance line welding comprising a pair of welding electrodes arranged to bear against and move relatively to the work and a source of welding current arranged to deliver to the welding electrodes an alternating current of a frequency so low as to permit the temperature of the weld to fall to a non-welding value during an interval at each zero point of the alternating current wave independently of whether such relative movement is rapid or so slow as to leave the electrode substantially stationary on the work during the welding intervals of the curent wave.

8. A system for resistance line welding comprising a pair of welding electrodes arranged to bear against and move relatively to the work, a source of welding current arranged to deliver to the welding electrodes an alternating current of a frequency so low as to permit the work to cool and harden during the zero points of the wave, and means whereby the speed of relative movement and the frequency of the alternating current may be adjusted.

9. A system for resistance line welding wherein a rotatable electrode is arranged to bear against and conduct welding current into the work and wherein means are provided for moving the electrode and work relatively characterized by the fact that means are arranged to supply a low frequency alternating current to the electrode, and by the fact that means are provided whereby the frequency of said current may be adjusted.

In witness whereof, I have hereunto set my hand this 15th day of December, 1922.

PETER P. ALEXANDER.